United States Patent
Kim et al.

(10) Patent No.: US 7,940,183 B2
(45) Date of Patent: *May 10, 2011

(54) ANTENNA FOR RADIO FREQUENCY IDENTIFICATION TAG

(75) Inventors: Jeong Seok Kim, Daejeon (KR); Won Kyu Choi, Daejeon (KR); Gil Young Choi, Daejeon (KR); Cheol Sig Pyo, Daejeon (KR); Jong-suk Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 361 days.

This patent is subject to a terminal disclaimer.

(21) Appl. No.: 12/126,005

(22) Filed: May 23, 2008

(65) Prior Publication Data
US 2009/0121879 A1    May 14, 2009

(30) Foreign Application Priority Data
Nov. 8, 2007   (KR) .................. 10-2007-0113767

(51) Int. Cl.
  G08B 13/14   (2006.01)
  H01Q 1/38    (2006.01)
(52) U.S. Cl. ........... 340/572.7; 340/572.1; 343/700 MS; 343/702; 343/895
(58) Field of Classification Search ............... 340/572.7, 340/572.1; 343/700 R, 743, 790, 795, 850, 343/860, 865, 700 MS, 702, 895
See application file for complete search history.

(56) References Cited

U.S. PATENT DOCUMENTS

| | | | |
|---|---|---|---|
| 6,028,564 A | 2/2000 | Duan et al. | |
| 6,215,402 B1 | 4/2001 | Rao Kodukula et al. | |
| 6,285,342 B1 | 9/2001 | Brady et al. | |
| 6,535,175 B2 | 3/2003 | Brady et al. | |
| 7,505,001 B2 * | 3/2009 | Deavours et al. | 343/700 MS |
| 7,557,757 B2 * | 7/2009 | Deavours et al. | 343/700 MS |
| 7,750,813 B2 * | 7/2010 | Deavours et al. | 340/572.7 |
| 2005/0024287 A1 * | 2/2005 | Jo et al. | 343/822 |
| 2007/0195003 A1 * | 8/2007 | Deavours et al. | 343/860 |
| 2009/0073066 A1 * | 3/2009 | Jordon et al. | 343/770 |
| 2009/0096678 A1 * | 4/2009 | Choi et al. | 343/700 MS |

FOREIGN PATENT DOCUMENTS

| | | |
|---|---|---|
| KR | 10-2002-0071779 A | 9/2002 |
| KR | 10-2007-0011659 A | 1/2007 |
| KR | 10-2007-0013994 A | 1/2007 |

OTHER PUBLICATIONS

Byunggil Yu et al., "RFID Antenna Using Two-Shorted Microstrip Patches Mountable on Metallic Objects", Microwave and Optical Technology Letters, vol. 49, No. 2, Feb. 2007, pp. 414-416.

* cited by examiner

Primary Examiner — Toan N Pham
(74) Attorney, Agent, or Firm — Kile Park Goekjian Reed & McManus PLLC

(57) ABSTRACT

The present invention relates to an antenna for an RFID tag chip. The antenna includes a dielectric material, a radiating patch that scatters a signal from the RFID tag chip for transmitting the scattered signal, and microstrip lines having a terminal for the RFID tag chip. Accordingly, a small antenna that can be attached to metal can be realized.

11 Claims, 6 Drawing Sheets

ANTENNA FOR RADIO FREQUENCY IDENTIFICATION TAG

CROSS-REFERENCE TO RELATED APPLICATION

This application claims priority to and the benefit of Korean Patent Application No. 10-2007-0113767 filed in the Korean Intellectual Property Office on Nov. 8, 2007, the entire contents of which are incorporated herein by reference.

BACKGROUND OF THE INVENTION (a) Field of the Invention

The present invention relates to an antenna for a radio frequency identification tag.

The present invention was supported by the IT R&D program of MIC/IITA [2006-S-023-02, Development of Advanced RFID System Technology].

(b) Description of the Related Art

A radio frequency identification (RFID) tag is used in various fields such as distribution and material handling industries, together with an RFID reader.

When an object to which the RFID tag is attached accesses a read zone of the RFID reader, the RFID reader transmits an interrogation signal to the RFID tag by modulating an RF signal having a specific frequency and the RFID tag responds to the interrogation of the RFID reader.

That is, the RFID reader transmits an interrogation signal to the RFID tag by modulating a continuous electromagnetic wave having a specific frequency, and the RFID tag transmits back the electromagnetic wave transmitted from the RFID reader after performing back-scattering modulation in order to transmit its own information stored in the RFID tag's internal memory. The back-scattering modulation is a method for transmitting tag information by modulating the amplitude and/or the phase of a scattered electromagnetic wave when the RFID tag transmits the electromagnetic wave that is initially transmitted from the RFID reader back to the RFID reader by scattering the electromagnetic wave.

Since a passive RFID tag does not include a separate operation power source, it rectifies the electromagnetic wave transmitted from the RFID reader and uses the rectified electromagnetic wave as its own power source to acquire operation power. The intensity of the electromagnetic wave transmitted from the RFID reader should be larger than a specific threshold value for normal operation. However, since the transmission power of the reader is limited by local regulations of each country, it is not possible to unconditionally raise the level of transmission power.

Therefore, the RFID tag should efficiently receive the electromagnetic wave transmitted from the RFID reader to extend the read zone without raising the transmission power level of the reader. A method for raising the receiving efficiency of the RFID tag is to perform complex conjugate-matching of an antenna and a radio frequency (RF) front-end of the RFID tag chip so as to maximize the intensity of the signal received by the RFID tag.

A conventional radio frequency identification (RFID) tag will be described in detail with reference to FIG. 1.

FIG. 1 is a configuration of a conventional RFID tag.

As shown in FIG. 1, the RFID tag includes an RFID tag chip 10 and an antenna 20 (hereinafter, referred to as "an RFID tag antenna") for an RFID tag.

The RFID tag chip 10 stores information on an object to which the RFID tag is attached, and modulates the amplitude and/or the phase of electromagnetic waves transmitted from an RFID reader for transmitting the information of the object. The RFID tag chip 10 modulates the amplitude and/or the phase of the wave by controlling the amount of power through input impedance, and includes an RF front-end that has input impedance.

The RFID tag antenna 20 scatters the electromagnetic wave that is modulated by the RFID tag chip 10. The RFID tag antenna 20 includes a dielectric material 21, a feed loop 23, radiating patches 25, and shorting plates 27.

The dielectric material 21 is quadrangle-shaped with a low dielectric constant, and a bottom surface of the dielectric material 21 is a ground surface that contacts the object.

The feed loop 23 is formed in an upper surface of the dielectric material 21, and is electrically connected to the RFID tag chip 10 so as to supply power thereto.

Each of the radiating patches 25 is formed in the upper surface of the dielectric material 211 and excites a current having an out-of-phase characteristic by using a current flowing through the feed loop 23 and radiates the excited current.

Each of the shorting plates 27 is formed in a part of a side surface of the dielectric material 21 and connects the radiating patches 25 and the ground surface. That is, the shorting plates 27 disconnect the radiating patches 25 and the ground surface.

Generally, in an RFID system including an RFID tag and an RFID reader, transmission power of the RFID reader is limited by local regulations of each country. Therefore, in order to extend a read zone of the RFID reader, the RFID tag antenna should have high efficiency, the RFID tag should resonate at a corresponding frequency, and the RFID tag antenna and the RF front-end of the RFID tag chip should be complex-conjugate matched.

However, the conventional RFID tag shown in FIG. 1 is not provided with a method for controlling impedance matching of RFID tag chips that have various impedance characteristics.

Further, there are difficulties in miniaturizing the RFID tag antenna and reducing cost.

SUMMARY OF THE INVENTION

The present invention has been made in an effort to realize a small antenna for a radio frequency identification (RFID) tag and to provide an RFID tag that can be attached to a metal material.

To achieve the above-described object, according to an exemplary embodiment of the present invention, an antenna is for a radio frequency identification (RFID) tag having a RFID tag chip. The antenna includes a dielectric material, a radiating patch, a first microstrip line, and a second microstrip line. The dielectric material includes a first side that contacts an object, a second side that is parallel with the first side, and a third side that connects the first side and the second side. The radiating patch is formed in a part of the second side, resonates at a resonance frequency that corresponds to a frequency of the RF signal, and scatters a signal from the RFID tag chip for transmission of the modulation signal. The first microstrip line is formed in a part of the second side, and includes a terminal for the RFID tag chip. The second microstrip line is formed in a part of the second side, and includes a terminal for the RFID tag chip.

The first microstrip line and the second microstrip line are connected through the RFID tag chips and are electromagnetically coupled with the radiating patch for supplying power to the RFID tag chip.

In addition, impedance of the antenna is conjugate-matched with impedance of the RFID tag chip.

A reactance component of the impedance of the antenna corresponds to a circumference length of the first microstrip line and a circumference length of the second microstrip line.

The first microstrip line is partially formed in a meandering shape, the second microstrip line is partially formed in a meandering shape, and the reactance component of the impedance of the antenna corresponds to the circumference length of the first microstrip line and the circumference length of the second microstrip line.

In this instance, the antenna further includes a shorting plate that connects the radiating plate and the first side so as to disconnect the radiating patch from the first side.

A resistance component of the impedance of the antenna corresponds to the size of the shorting plate.

In addition, the resonance frequency corresponds to the size of the radiating patch.

The dielectric material has a relative dielectric constant of greater than 20.

The antenna further includes a first shorting plate and a second shorting plate. The first shorting plate is partially formed in the third side and connects the first microstrip line and the first side so as to disconnect the first microstrip line from the first side, and the second shorting plate is partially formed in the third side and connects the second microstrip line and the first side so as to disconnect the second microstrip line from the first side.

The antenna further includes a third shorting plate formed in a part of the third side, and connects the radiating patch and the first side to disconnect the radiating patch from the first side.

BRIEF DESCRIPTION OF THE DRAWINGS

An exemplary embodiment of the present invention will be described in detail with reference to the accompanying drawings for clear understanding of advantages of the present invention, wherein.

DETAILED DESCRIPTION OF THE EMBODIMENTS

Figure 1:
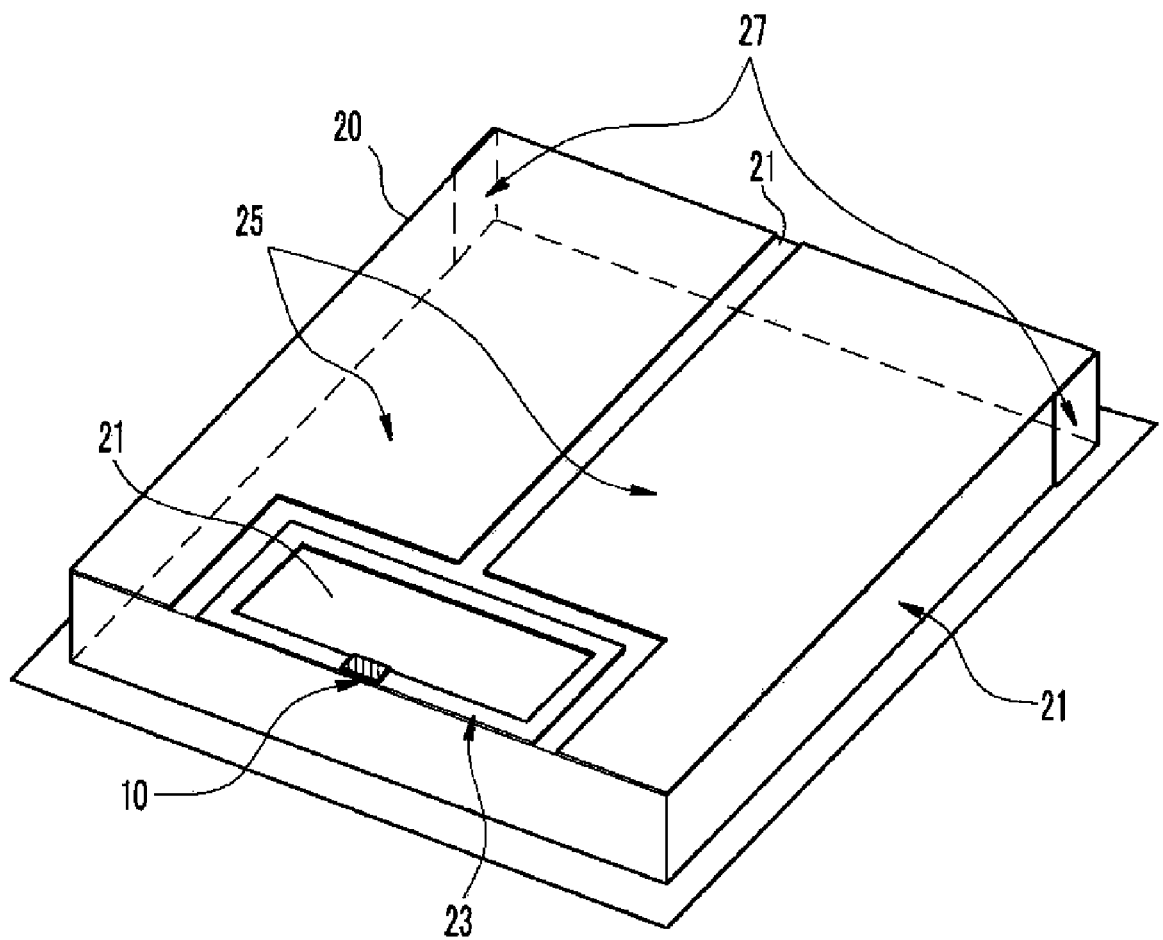
FIG. 1 is a configuration of a conventional radio frequency identification (RFID) tag.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprising" and variations such as "comprises" will be understood to imply the inclusion of stated elements but not the exclusion of any other elements.

A radio frequency identification (RFID) tag antenna according to an exemplary embodiment of the present invention will be described with reference to the drawings.

An RFID tag including an RFID tag antenna according to the exemplary embodiment of the present invention will be described in detail with reference to FIG. 2 and FIG. 3.

Figure 2:
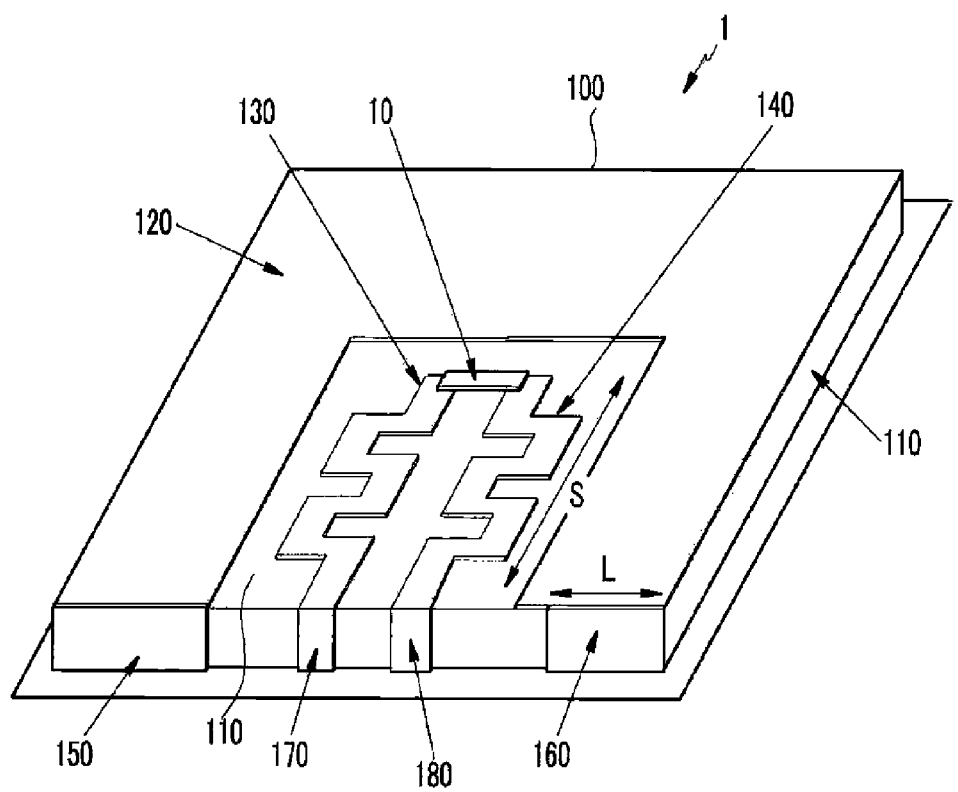
FIG. 2 is a configuration of an RFID tag according to an exemplary embodiment of the present invention.

FIG. 2 show a configuration of an RFID tag according to the exemplary embodiment of the present invention.

As shown in FIG. 2, the RFID tag 1 according to the exemplary embodiment of the present invention includes an RFID tag chip 10 and an antenna 100 (hereinafter, referred to as "an RFID tag antenna") for the RFID tag 1.

The RFID tag chip 10 stores information on an object to which an RFID tag is attached, and generates a radio frequency (RF) signal that is transmitted from an RFID reader and modulates the RF signal so as to transmit the object information. The RFID tag chip 10 may control the amount of power by using input impedance so as to modulate the amplitude and/or the phase of the RF signal, and may include a radio frequency (RF) front-end having the input impedance.

The RFID tag antenna 100 includes a dielectric material 110, a radiating patch 120, microstrip lines 130 and 140, shorting plates 150 and 160 that disconnect the radiating patch 120, and shorting plates 170 and 180 that respectively disconnect microstrip lines 130 and 140, and it receives an RF signal transmitted from the RFID reader, and transmits the RF signal modulated by the RFID tag chip 10 to the RFID reader.

The dielectric material 110 having a relative dielectric constant of equal to and more than 20 is made of a ceramic material and has a cuboid shape, and a bottom surface of the dielectric material 110 is a ground surface that contacts the object. According to the exemplary embodiment of the present invention, the RFID tag antenna 100 can be miniaturized by using the ceramic dielectric material 110.

The radiating patch 120 is formed on portions of the dielectric material 110 and, for convenience in electromagnetic-coupling with the microstrip lines 130 and 140, surrounds the microstrip lines 130 and 140 in a predetermined distance. Thereby, the electromagnetic-coupling is formed a space of the dielectric material 110 between the radiating patch 120 and the adjacent microstrip line 130 or 140.

Each of the microstrip lines 130 and 140 (i.e., first microstrip line 130 and second microstrip line 140) partially has a meandering structure and is formed on a part of the upper surface of the dielectric material 110. Herein, a terminal is formed in an end point of the first microstrip line 130 and an end point of the second microstrip line 140 for the RFID tag chip 10. In addition, each of the first and second microstrip lines 130 and 140 has a vertical length S that corresponds to a straight line length between lateral ends of the respective microstrip lines 130 and 140.

The microstrip lines of the RFID tag antenna according to the exemplary embodiment of the present invention will now be described in further detail with reference to FIG. 3.

Figure 3:
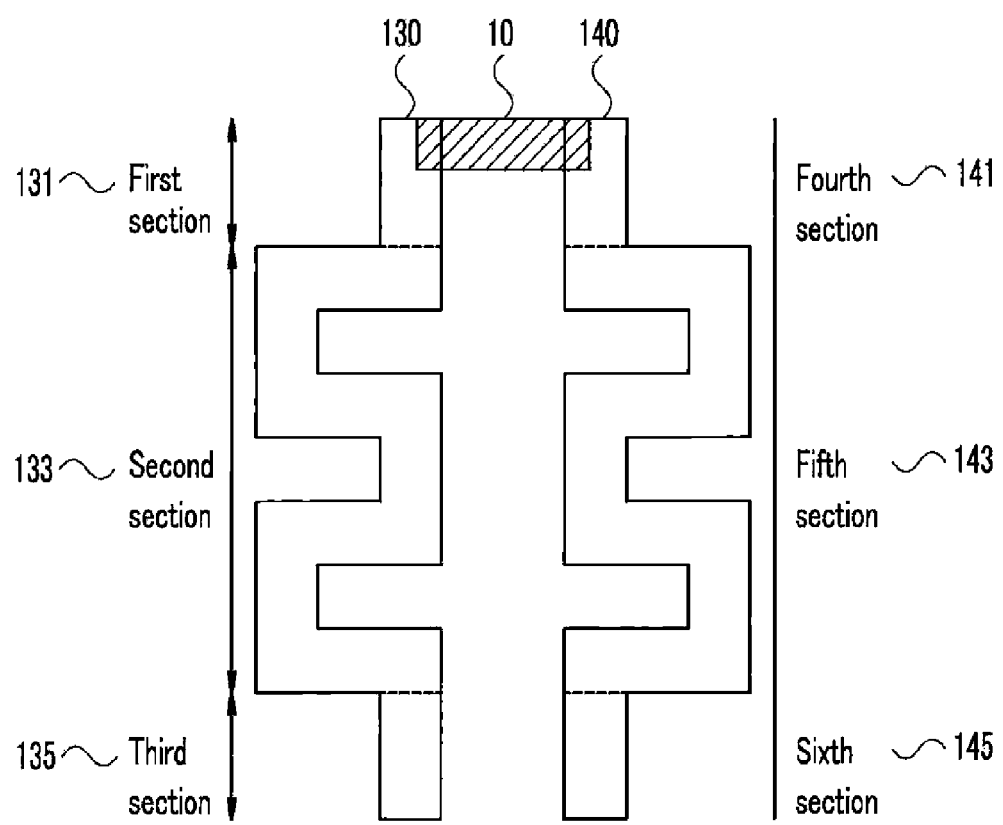
FIG. 3 is a configuration of each of microstrip lines of an RFID tag antenna according to the exemplary embodiment of the present invention.

FIG. 3 show a configuration of each of the microstrip lines of the RFID tag antenna according to the exemplary embodiment of the present invention.

As shown in FIG. 3, the first microstrip line 130 according to the exemplary embodiment of the present invention is divided into a first section 131, a second section 133, and a third section 135.

The first section 131 straightly extends in a lower direction from an upper end point of the first microstrip line 130.

The second section 133 formed in a meandering shape extends in a lower direction from an end point of the first section 131.

The third section 135 straightly extends in the lower direction from an end point of the second section 133. In this instance, a lower end point of the third section corresponds to a lower end point of the first microstrip line 130.

In addition, the second microstrip line 140 is divided into a fourth section 141, a fifth section 143, and a sixth section 145.

The fourth section 141 straightly extends in a lower direction from an upper end point of the second microstrip line 140.

The fifth section 143 formed in a meandering shape extends in a lower direction from an end point of the fourth section 141.

The sixth section 145 straightly extends in a lower direction from an end point of the fifth section 143. In this instance, a lower end point of the sixth section 145 corresponds to a lower end point of the second microstrip line 140.

The RFID tag including the RFID tag antenna according to the exemplary embodiment of the present invention will be described with reference to FIG. 2.

Each of the shorting plates 150 and 160 (i.e., first and second shorting plates 150 and 160) is formed in a part of a side to which the lower end point of the first microstrip line 130 and the lower end point of the second microstrip line 140 are adjacent among four sides of the dielectric material 110, and connects the radiating patch 120 and the ground surface to disconnect the radiating patch 120 and the ground surface. Each of the first shorting plate 150 and the second shorting plate 160 has a horizontal length L that determines the size of each area of the first and second shorting plates 150 and 160.

Each of the shorting plates 170 and 180 (i.e., third shorting plate 170 and fourth shorting plate 180) is formed in a part of the same side that the first and second shorting plates 150 and 160 are formed. The third shorting plate 170 connects the first microstrip line 130 and the ground surface to disconnect the first microstrip line 130 and the ground surface, and the fourth shorting plate 180 connects the second microstrip line 140 and the ground surface to disconnect the second microstrip line 140 and the ground surface.

The first microstrip line 130 and the second microstrip line 140 are electromagnetically coupled with the radiating patch 120 and the electromagnetic-coupling serves as an impedance transformer in the RFID tag antenna 100.

In design of the RFID tag antenna 100 according to the exemplary embodiment of the present invention, a resistance component of impedance of the RFID tag antenna 100 can be designed to be controlled by changing the horizontal length L of each of the first and second shorting plates 150 and 160, that is, the size of each of the first and second shorting plates 150 and 160. The resistance component of the impedance of the RFID tag antenna 100 can be designed to be controlled by changing the size of one of the first and second shorting plates 150 and 160.

In addition, in design of the RFID tag antenna 100 according to the exemplary embodiment of the present invention, a reactance component of the impedance of the RFID tag antenna 100 can be designed to be controlled by changing the vertical length S of each of the first and second microstrip lines 130 and 140, that is, the circumference length of each of the first and second microstrip lines 130 and 140.

Further, a resonance frequency of the RFID tag antenna 100 can be designed to be controlled by changing the size of the radiating patch 120 according to the exemplary embodiment of the present invention.

An equivalent circuit of the RFID tag antenna and the RF front-end of the RFID tag chip according to the exemplary embodiment of the present invention will be described with reference to FIG. 4.

Figure 4:
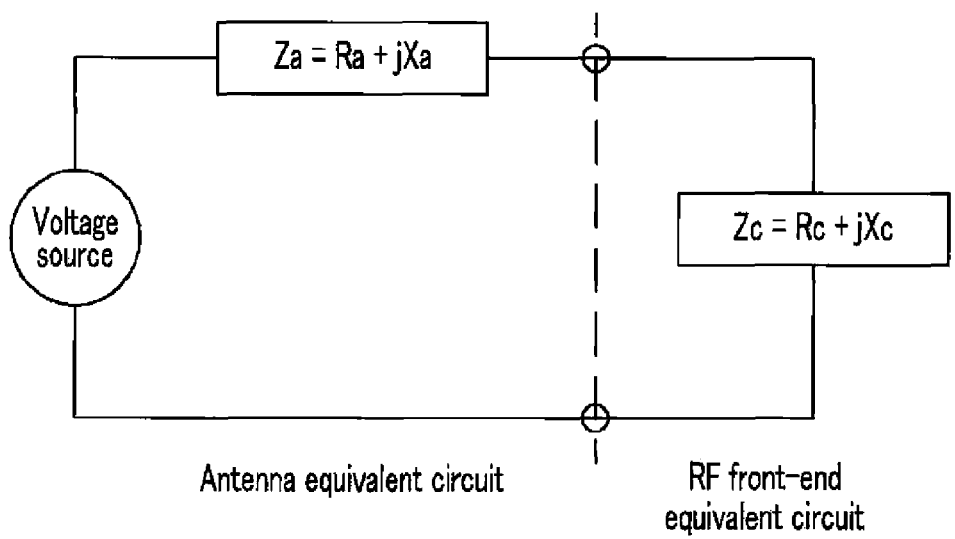
FIG. 4 is a configuration of an equivalent circuit of the RFID tag antenna and an equivalent circuit of an RF front-end according to the exemplary embodiment of the present invention.

FIG. 4 shows an equivalent circuit of the RFID tag antenna and the RF front-end according to the exemplary embodiment of the present invention.

As shown in FIG. 4, the equivalent circuit includes a voltage source, impedance of the RFID tag antenna 100, and impedance of the RF front-end. In this instance, the voltage source and the impedance $Z_a$ of the RFID tag antenna 100 are an equivalent circuit of the RFID tag antenna 100, and the impedance $Z_c$ of the RF front-end of the RFID tag chip 10 is an equivalent circuit of the RF front-end.

The impedance $Z_a$ of the RFID tag antenna 100 has a real part $R_a$ and an imaginary part $X_a$, and the impedance $Z_c$ of the RF front-end has a real part $R_c$ and an imaginary part $X_c$.

The RFID tag antenna 100 transmits the maximum power to the RF front-end of the RFID tag chip 10 by conjugate-matching the impedance $Z_a$ of the RFID tag antenna 100 and the impedance $Z_c$ of the RF front-end as shown in Equation 1.

$$R_a = R_c$$
$$X_a = -X_c \quad \text{[Equation 1]}$$

A typical impedance value of the RF front-end is about 50Ω, but in the exemplary embodiment of the present invention, the impedance of the RF front-end has a complex value. That is, the impedance $Z_c$ of the RF front-end has a relatively small resistance component $R_c$ and a relatively large capacitive reactance component $X_c$. Therefore, the impedance $X_a$ of the RFID tag antenna 100 should have a low resistance component $R_a$ and a high inductive reactance component $X_a$, and should simultaneously resonate at a corresponding frequency.

In design of the RFID tag antenna 100 according to the exemplary embodiment of the present invention, the impedance $Z_a$ of the RFID tag antenna 100 can be designed to have a low resistance component $R_a$ by changing the size of each of the first and second shorting plates 150 and 160.

In addition, the impedance $Z_a$ of the RFID tag antenna 100 according to the exemplary embodiment of the present invention can be designed to have a high inductive reactance component $X_a$ by changing the circumference length of each of the first and second microstrip lines 130 and 140.

Further, the RFID tag antenna 100 according to the exemplary embodiment of the present invention can be designed to be resonated at a frequency corresponding to a frequency of the RF signal transmitted from the RFID reader by changing the size of the radiating patch 120.

Figure 5:
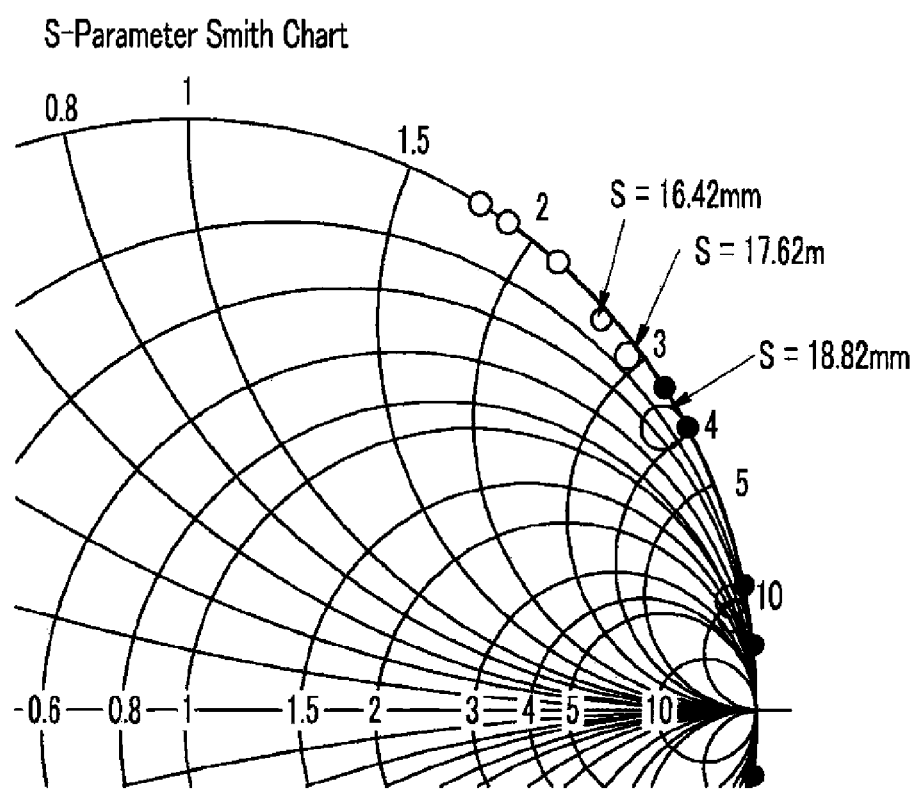
FIG. 5 shows impedance variation with change of a circumference length of the microstrip line according to the exemplary embodiment of the present invention.
Figure 6:
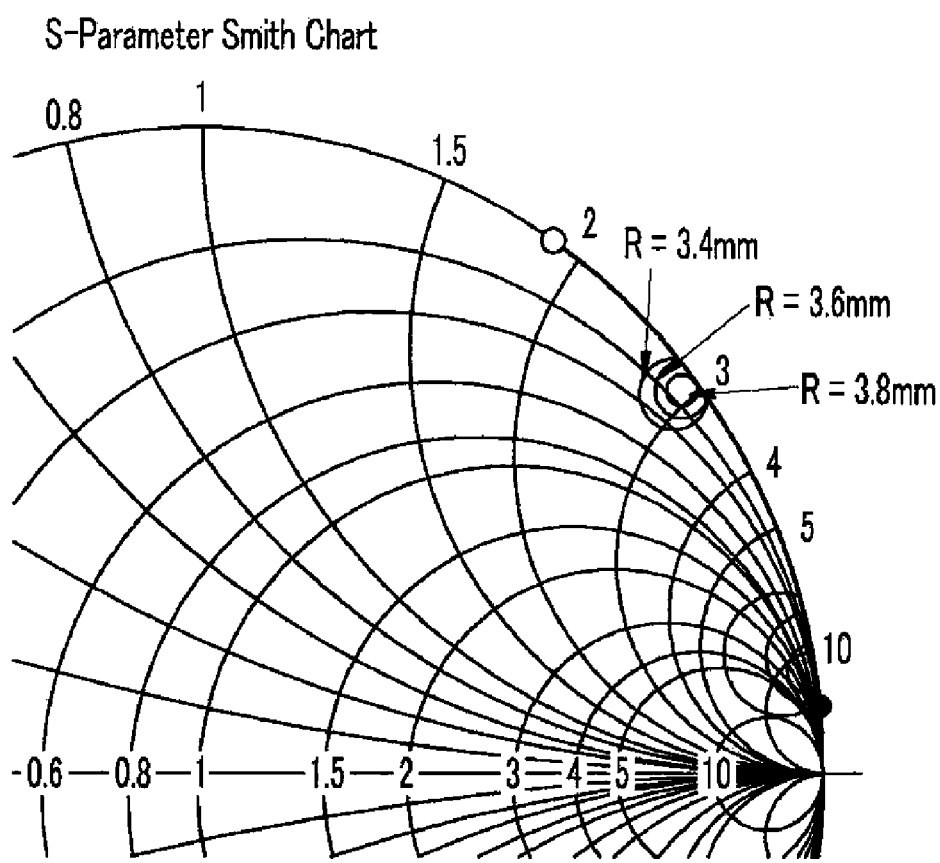
FIG. 6 shows impedance variation with change of the size of a shorting plate according to the exemplary embodiment of the present invention.

With reference to FIG. 5 and FIG. 6, impedance variation of the RFID tag antenna according to the exemplary embodiment of the present invention will be described.

FIG. 5 shows impedance variation with change of the circumference length of the microstrip line according to the exemplary embodiment of the present invention. In FIG. 5, the impedance $Z_a$ of the RFID tag antenna 100 that varies with change of the vertical length S of each of the microstrip lines 130 and 140, that is, the circumference length of each of the microstrip lines 130 and 140 is marked on the Smith chart.

As shown in FIG. 5, when the vertical length S of each of the microstrip lines 130 and 140 is changed from about 16.42 mm to about 18.82 mm, the resistance component $R_a$ of the impedance $Z_a$ of the RFID tag antenna 100 is maintained at an almost constant level while the reactance component $X_a$ is increased.

FIG. 6 shows impedance variation with change of the size of the shorting plate according to the exemplary embodiment of the present invention. In FIG. 6, the impedance $Z_a$ of the RFID tag antenna 100 that varies with change of the horizontal length L of the second shorting plate 160, that is, the size of the second shorting plate 160 is marked on the Smith chart.

As shown in FIG. 6, the reactance component $X_a$ of the impedance of the RFID tag antenna 100 is constantly maintained and the resistance component $R_a$ is increased when the horizontal length L of the second shorting plate 160 is changed from about 3.4 mm to about 3.8 mm.

According to the exemplary embodiment of the present invention, a small RFID tag antenna that can be attached to a metal material and be efficiently matched to an RFID tag chip can be provided.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An antenna for a radio frequency identification (RFID) tag having a RFID tag chip, the antenna comprising:
   a dielectric material having a first side that contacts an object, a second side that is parallel with the first side, and a third side that connects the first side and the second side;
   a radiating patch formed on a part of the second side, that is resonated at a resonance frequency that corresponds to a frequency of a radio frequency (RF) signal received from an external, and scattering a signal from the RFID tag chip for transmission of the scattered RF signal; and
   a first microstrip line formed in a part of the second side, and having a terminal for the RFID tag chip; and
   a second microstrip line formed in a part of the second side, and having a terminal for the RFID tag chip.

2. The antenna of claim 1, wherein the first microstrip line and the second microstrip line are connected to each other through the RFID tag chip, and supply power to the RFID tag chip through electromagnetic-coupling with the radiating patch.

3. The antenna of claim 2, wherein impedance of the antenna is conjugate-matched with impedance of the RFID tag chip.

4. The antenna of claim 3, wherein a reactance component of the impedance of the antenna corresponds to a circumference length of the first microstrip line and a circumference length of the second microstrip line.

5. The antenna of claim 4, wherein the first microstrip line is partially formed in a meandering shape, the second microstrip line is partially formed in a meandering shape, and the reactance component of the impedance of the antenna corresponds to the circumference length of the first microstrip line and the circumference length of the second microstrip line.

6. The antenna of claim 3, further comprising a shorting plate formed in a part of the third side, and connecting the radiating patch and the first side to disconnect the radiating patch and the first side.

7. The antenna of claim 6, wherein a resistance component of the impedance of the antenna corresponds to the size of the shorting plate.

8. The antenna of claim 3, wherein the resonance frequency corresponds to the size of the radiating patch.

9. The antenna of claim 1, wherein the dielectric material has a relative dielectric constant equal to and more than 20.

10. The antenna of claim 1, further comprising:
    a first shorting plate formed in a part of the third side, and connecting the first microstrip line and the first side to disconnect the first microstrip line from the first side; and
    a second shorting plate formed in a part of the third side, and connecting the second microstrip line and the first side to disconnect the second microstrip line from the first side.

11. The antenna of claim 10, further comprising a third shorting plate formed in a part of the third side, and connecting the radiating patch and the first side to disconnect the radiating patch from the first side.

* * * * *